United States Patent
Santos-Gomez

(10) Patent No.: US 9,146,752 B2
(45) Date of Patent: Sep. 29, 2015

(54) EFFICIENT BROWSING, SELECTION, VISUALIZATION, AND TRACING OF COMPLEX MULTI-DIMENSIONAL RELATIONSHIPS AMONG OBJECTS

(75) Inventor: Lucinio Santos-Gomez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 13/227,329

(22) Filed: Sep. 7, 2011

(65) Prior Publication Data

US 2013/0061177 A1   Mar. 7, 2013

(51) Int. Cl.
*G06F 3/0482*  (2013.01)
*G06F 9/44*  (2006.01)
*G06F 3/033*  (2013.01)

(52) U.S. Cl.
CPC ............ *G06F 9/4443* (2013.01); *G06F 3/0482* (2013.01); *G06F 3/033* (2013.01)

(58) Field of Classification Search
None
See application file for complete search history.

(56) References Cited

U.S. PATENT DOCUMENTS

| | | | |
|---|---|---|---|
| 7,065,493 B1 | 6/2006 | Homsi | |
| 2005/0114778 A1* | 5/2005 | Branson et al. | 715/711 |
| 2005/0131945 A1* | 6/2005 | Muller et al. | 707/104.1 |
| 2006/0206837 A1* | 9/2006 | Steiner | 715/854 |
| 2006/0253796 A1* | 11/2006 | Wang et al. | 715/788 |
| 2007/0101321 A1* | 5/2007 | Mahoney et al. | 717/168 |
| 2008/0270444 A1 | 10/2008 | Brodie et al. | |
| 2008/0313538 A1* | 12/2008 | Hudson | 715/702 |
| 2009/0031239 A1* | 1/2009 | Coleran et al. | 715/771 |
| 2009/0037848 A1 | 2/2009 | Tewari et al. | |
| 2009/0282364 A1* | 11/2009 | White et al. | 715/804 |
| 2010/0105443 A1* | 4/2010 | Vaisanen | 455/566 |
| 2010/0262477 A1 | 10/2010 | Hillerbrand et al. | |

* cited by examiner

*Primary Examiner* — Tuyetlien Tran
*Assistant Examiner* — David S Posigian
(74) *Attorney, Agent, or Firm* — Jeffrey T. Holman

(57) ABSTRACT

A method for interacting with multi-dimensional object relationships, including: opening an expandable dialog in response to detecting a cursor hover event by a cursor on a first object in a user interface, wherein the user interface is displayed on a display device; expanding the dialog according to a navigable chain of object relationships, wherein the chain of object relationships includes progressive lists of possible objects linked by lists of possible relationships, wherein the dialog is responsive to compound hovering by the cursor; and saving a relationship path selected from the chain of object relationships according to a user selection of a second object, wherein the relationship path includes the second object linked to the first object by a first relationship.

17 Claims, 9 Drawing Sheets

EFFICIENT BROWSING, SELECTION, VISUALIZATION, AND TRACING OF COMPLEX MULTI-DIMENSIONAL RELATIONSHIPS AMONG OBJECTS

BACKGROUND

Artifacts of different types spanning different domains, projects, and/or applications can be related and linked across a multitude of possible relationships. Exploring, navigating, and searching the resulting potential object-by-relationship space can be useful in many scenarios to identify specific relationship paths that link or trace a set of specific artifacts or objects along a specific set of relationships between.

One scenario in which this can be especially useful is during software development dealing with relationships (for example, "Is Child of", "Is Parent of", "Tested by", "Implemented by", "Is Tracked by", etc.) among artifact types (for example, "Requirements", "Stories", "Defects", "Tasks", "Test Cases", etc.). Allowing multiple entities involved in various phases of the development process to interact with the object-relationship paths can be beneficial.

SUMMARY

Embodiments of a system are described. In one embodiment, the system is an object relationship management system. The system includes: a user interface displayed on a display device, wherein the user interface is configured to: open an expandable dialog in response to detecting a cursor hover event by a cursor on a first object in the user interface, wherein the user interface is displayed on a display device; expand the dialog according to a navigable chain of object relationships, wherein the chain of object relationships includes progressive lists of possible objects linked by lists of possible relationships, wherein the dialog is responsive to compound hovering by the cursor; and save a relationship path selected from the chain of object relationships according to a user selection of a second object, wherein the relationship path includes the second object linked to the first object by a first relationship. Other embodiments of the system are also described. Other embodiments of a method and a computer program product are also described. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
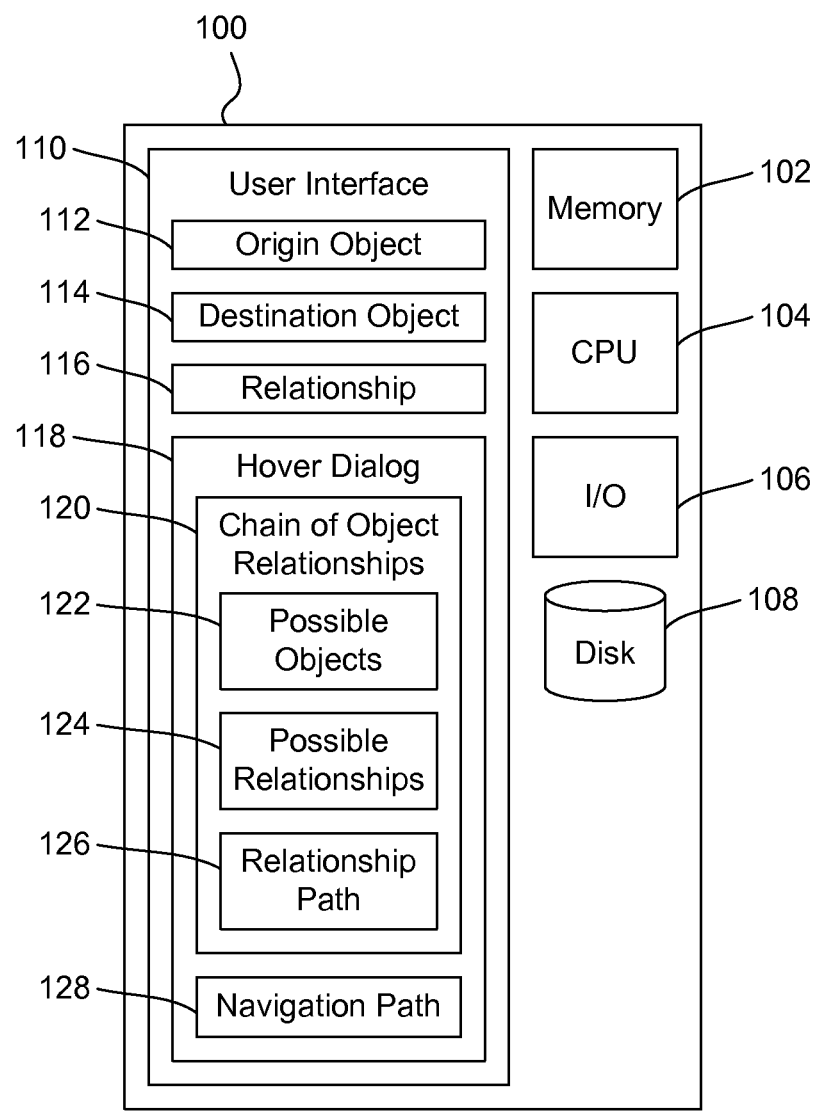
FIG. 1 depicts a schematic diagram of one embodiment of an object relationship management system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for interacting in various ways with multi-dimensional object relationships. Specifically, the system provides a user interface that allows a user to browse, select, visualize, and trace complex multi-dimensional relationships among objects. In one embodiment, a hover dialog is displayed proximate the object in the user interface that allows the user to progressively navigate a chain of object relationships, to save a relationship path selected from the chain of object relationships, and to display the saved relationship path next to the object in the user interface.

Conventional systems establish and identify relationships among artifacts or objects through pairwise links of objects. This approach may rely on common hyperlink mechanisms, and may force users to interact with multiple links and views when attempting to trace complex relationships spanning multiple (more than two) artifacts. Interacting with multiple links by clicking on each link to see the pairwise links of objects can be tedious and inconvenient for use during various stages of a development process. Different entities may be involved in the various stages of a development processes.

For example, a software program development process may include several different phases—such as development, testing, design, marketing, etc.—each phase involving one or more separate entities. In a development phase, developers may want to easily track which objects are related to a certain object and how those objects are linked in order to more accurately track the objects. In a testing phase, test cases to validate the correct implementation may rely on testers being able to view the object relationships. In other phases, an entity may desire to design an implementation of the software program or perform other operations in the development process involving object relationships.

By providing a user interface that allows interaction with multi-dimensional object relationships, the system and method described herein enable improved management of a development process or other process involving object relationships. The system and method described facilitate navigation, exploration, and selection of a multi-relationship space among large sets of objects. In one embodiment, the system and method describe: progressively uncovering the relationships among objects through compound hovering through a hover dialog; identifying, selecting, and saving (for later display) a relationship path from a given object to other objects in a multi-dimensional relationship space with a single click; and displaying simultaneously multiple relationship paths and sub-paths previously browsed, identified, selected and saved that trace multi-dimensional relationships.

Figure 5:
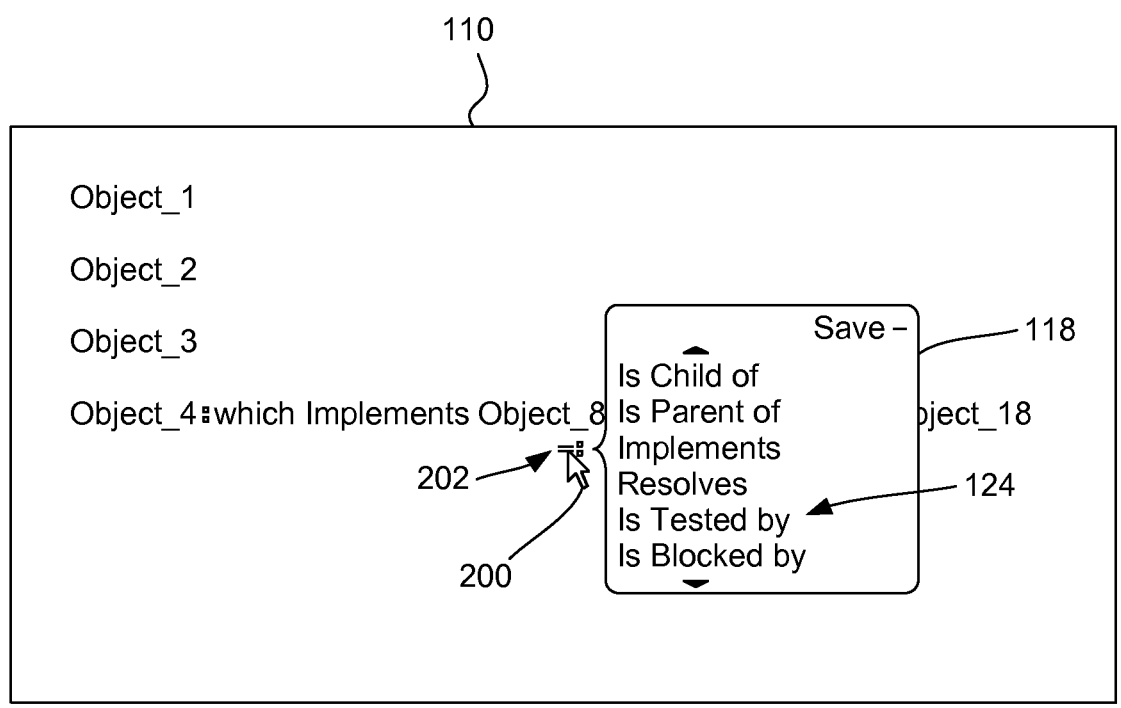
FIG. 5 depicts a schematic diagram of one embodiment of the user interface of FIG. 2.

FIG. 1 depicts a schematic diagram of one embodiment of an object relationship management system. The depicted object relationship management system 100 includes various components, described in more detail below, that are capable of performing the functions and operations described herein. In one embodiment, at least some of the components of the object relationship management system 100 are implemented in a computer system. For example, the functionality of one or more components of the object relationship management system 100 may be implemented by computer program instructions stored on a computer memory device 102 and executed by a processing device 104 such as a CPU. The object relationship management system 100 may include other components, such as a disk storage drive 108, input/output devices 106, and a user interface 110. Some or all of the components of the object relationship management system 100 may be stored on a single computing device or on a network of computing devices, including a wireless communication network. The object relationship management system 100 may include more or fewer components or subsystems than those depicted herein. In some embodiments, the object relationship management system 100 may be used to implement the methods described herein as depicted in FIG. 5.

In one embodiment, the object relationship management system 100 includes a user interface 110 that allows a user to interact with the object relationship management system 100. The user interface 110 may be implemented in a computer system that allows the user to interact with the user interface 110 using a mouse or other computer input device. The user interface 110 may be displayed on an output device such as a display device. The input/output devices may include other components or devices that perform various operations for the computer system.

In one embodiment, the user interface 110 is configured to allow a user to interact with objects for a given application. The application may be any application in which elements corresponding to the application may be represented by objects visible to the user on the user interface 110. In one embodiment, a first or origin object 112 can be linked to one or more other objects via one or more relationships 116. A relationship 116 describes a type of link between objects, in some embodiments, or how the objects interact with each other in other embodiments.

In one embodiment, the user is able to open a hover dialog 118 for an origin object 112. Upon opening, the hover dialog 118 may display a chain of object relationships 120. The chain of object relationships 120 may include one or more progressive lists of possible relationships 124 for the origin object 112. A list of possible relationships 124 displayed when the hover dialog 118 is first opened may include any relationship 116 that is compatible with the origin object 112. The user may select or highlight one of the possible relationships 124 to open a list of possible objects 122 that are compatible with the highlighted relationship 116. In one embodiment, the user selects or highlights elements in the chain of object relationships 120 by hovering over the desired object or relationship 116.

The user may progressively select or highlight objects and relationships 116 in the chain of object relationships 120 to create a relationship path 126 for the origin object 112 that shows a path of objects and their relationships 116 from the origin object 112 to a destination object 114. The relationship path 126 may be saved and displayed in the user interface 110 next to the origin object 112 for later reference. In one embodiment, as the user highlights elements in the chain of object relationships 120, the hover dialog 118 may display a navigation path 128 that follows the highlighted elements in the chain of object relationships 120 through the lists of possible objects 122 and lists of possible relationships 124. The navigation path 128 may include any portion of the chain of object relationships 120 displayed in a current view of the hover dialog 118 based on the highlighted elements in the chain of object relationships 120.

Figure 2:
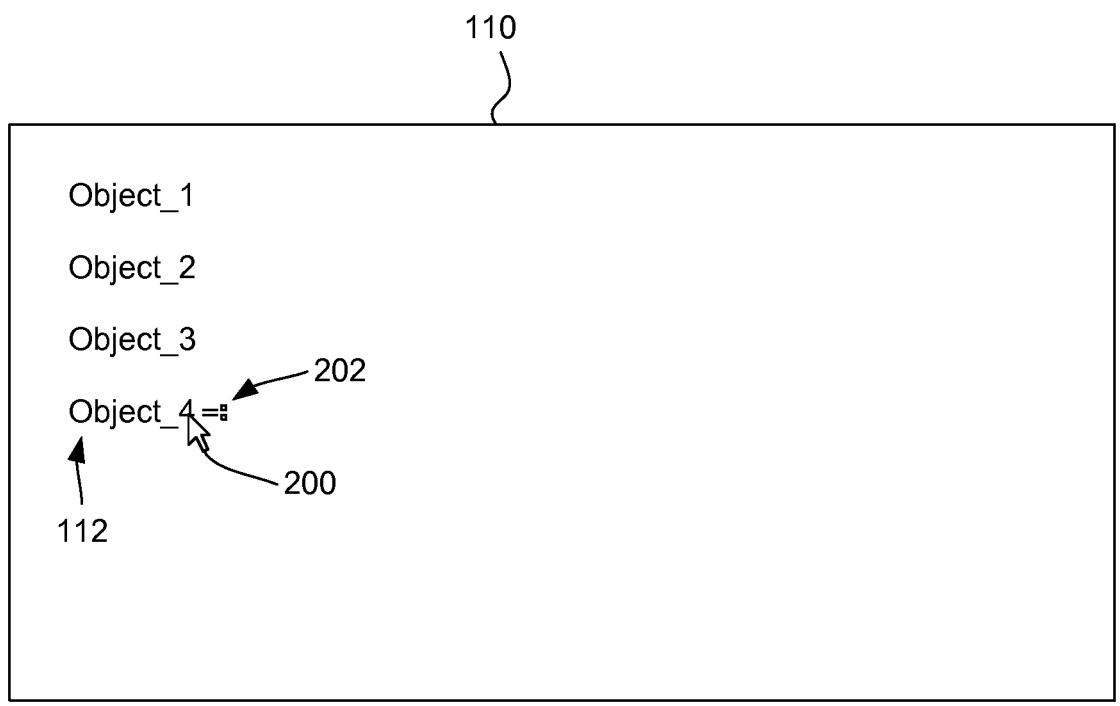
FIG. 2 depicts a schematic diagram of one embodiment of a user interface.

FIG. 2 depicts a schematic diagram of one embodiment of a user interface 110. While the object relationship management system 100 is described herein in conjunction with the user interface 110 of FIG. 2, the object relationship management system 100 may be used in conjunction with any user interface 110.

In one embodiment, the user interface 110 is configured to allow the user to manage relationships 116 between objects corresponding to a given application. The objects may be components associated with specific operations or components of the application. The combination of all objects for the application may control the operation and functionality of the application. The user may be able to view all objects (or labels representing the objects) associated with the application and interact with the objects in a variety of ways, including moving the objects within the view, modifying a hierarchy of the objects, modifying other aspects of the objects, deleting objects, and interacting with the objects in any other manner according to the given application. The user interface 110 may also allow the user to interact with the user interface 110 in a variety of ways, including browsing the objects, identifying the objects (using descriptive text), selecting objects or portions of the user interface 110, and other operations.

In one embodiment, the user interface 110 is configured to track the position of the cursor 200 within the user interface 110. When the user interface 110 detects that the cursor 200 hovers over an origin object 112, the user interface 110 may display a graphic icon 202 indicating that a hover dialog 118 may be opened. In one embodiment, the graphic icon 202 may be an object-relationship affordance to indicate that the hover dialog 118 includes a list of possible relationships 124 that correspond to the origin object 112 on which the cursor 200 hovers.

In one embodiment, the hover dialog 118 is opened to the right of the origin object 112 on which the cursor 200 hovers. In some embodiments, the graphic icon 202 may be displayed where the hover dialog 118 is to be opened, such that the cursor 200 may be positioned within the hover dialog 118 when the user performs a selection action on the graphic icon 202, such as by clicking or hovering. Selecting the graphic icon 202 may initiate an active state for the hover dialog 118. Clicking outside of the hover dialog 118, in some embodiments, may exit the active state for the hover dialog 118 and close the hover dialog 118.

In some embodiments, the graphic icon 202 may be placed in the nearest available space to the position where the mouse is currently located to minimize the travel time between the cursor 200 and the graphic icon 202 when the graphic icon 202 is displayed when the cursor 200 hovers over the origin object 112. For example, if the hover dialog 118 is to be displayed to the right of the origin object 112, when the distance between the cursor 200 and the right end of the origin object 112 is more than a configurable quantity, the user interface 110 may calculate a position closer to the cursor 200 for the graphic icon 202 to be displayed. In one embodiment, the position of the graphic icon 202 is located at the right end of the origin object 112 unless the distance from the cursor 200 to the right end of the origin object 112 is greater than the height of the object 112 plus the top/bottom padding of the origin object 112 as displayed on the user interface 110, in which case the graphic icon 202 may be displayed above or below the origin object 112 proximate the cursor 200.

Figure 3A:
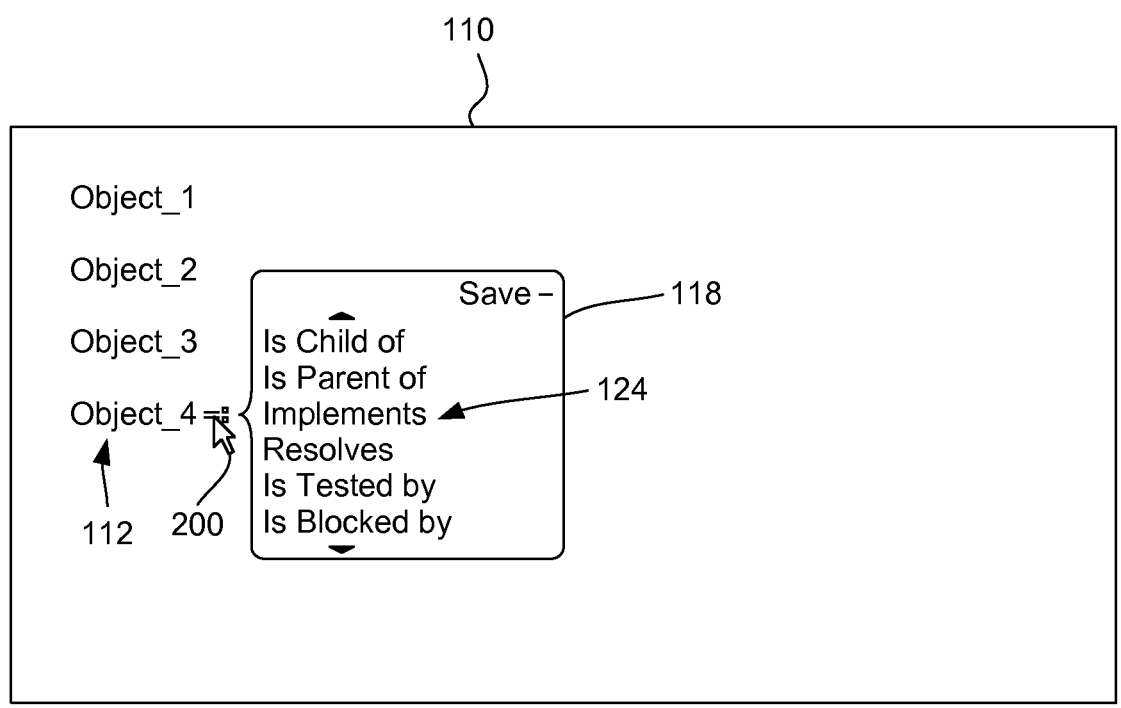
FIGS. 3A-3B depict a schematic diagram of one embodiment of the user interface of FIG. 2.
Figure 3B:
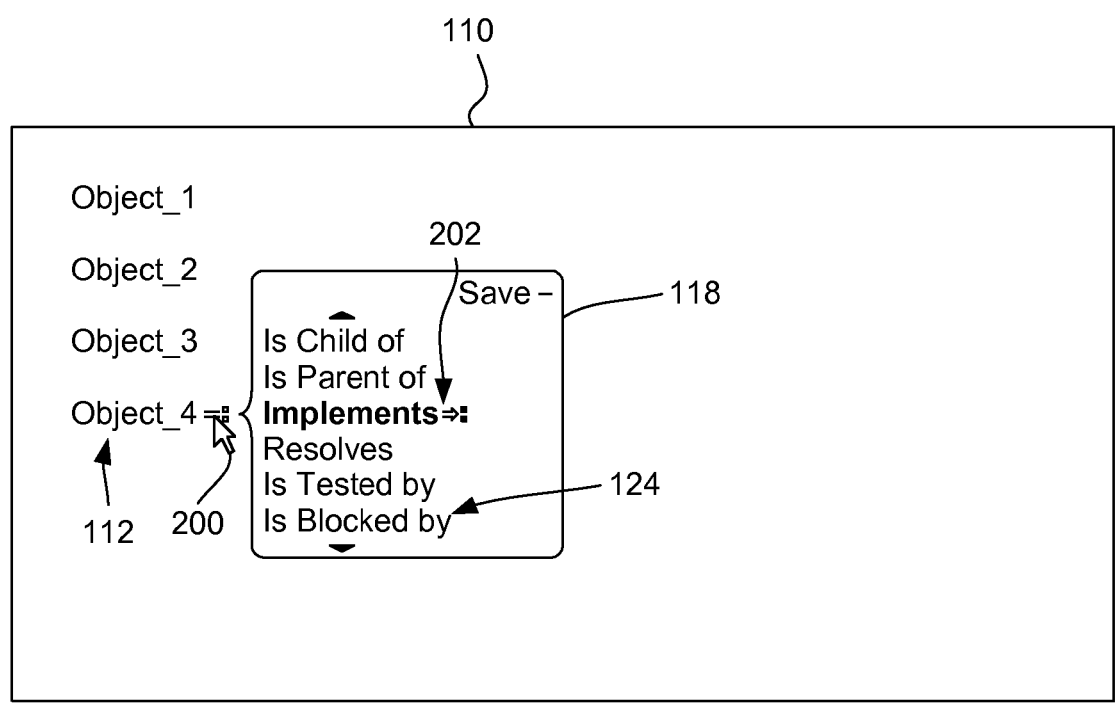

FIGS. 3A and 3B depict a schematic diagram of one embodiment of the user interface 110 of FIG. 2. In one embodiment, the user interface 110 is configured to open the hover dialog 118 and to display a portion of the chain of object relationships 120 in the hover dialog 118 when the graphic icon 202 is selected. When the hover dialog 118 is first opened, a list of possible relationships 124, each corresponding to the original or selected object 112, is displayed.

In one embodiment, the list of possible relationships 124 may be larger than the visible boundary of the hover dialog 118. In such an embodiment, the hover dialog 118 may be configured to allow the user to scroll through the list of possible relationships 124. The list of possible relationships 124 describes the possible relationships 124 between the origin object 112 and any other relationship 116 for the given application. The list of possible relationships 124 includes any relationship 116 compatible with the origin object 112. Consequently, the list of possible relationships 124 may include as few as one possible relationship or as many as all relationships 116 included in the given application. Highlighting a relationship 116 in the list of possible relationships 124 by hovering over the relationship 124 may cause a relationship-object affordance or other graphical icon 202 to appear next to the relationship 116, as shown in FIG. 3B.

Figure 4A:
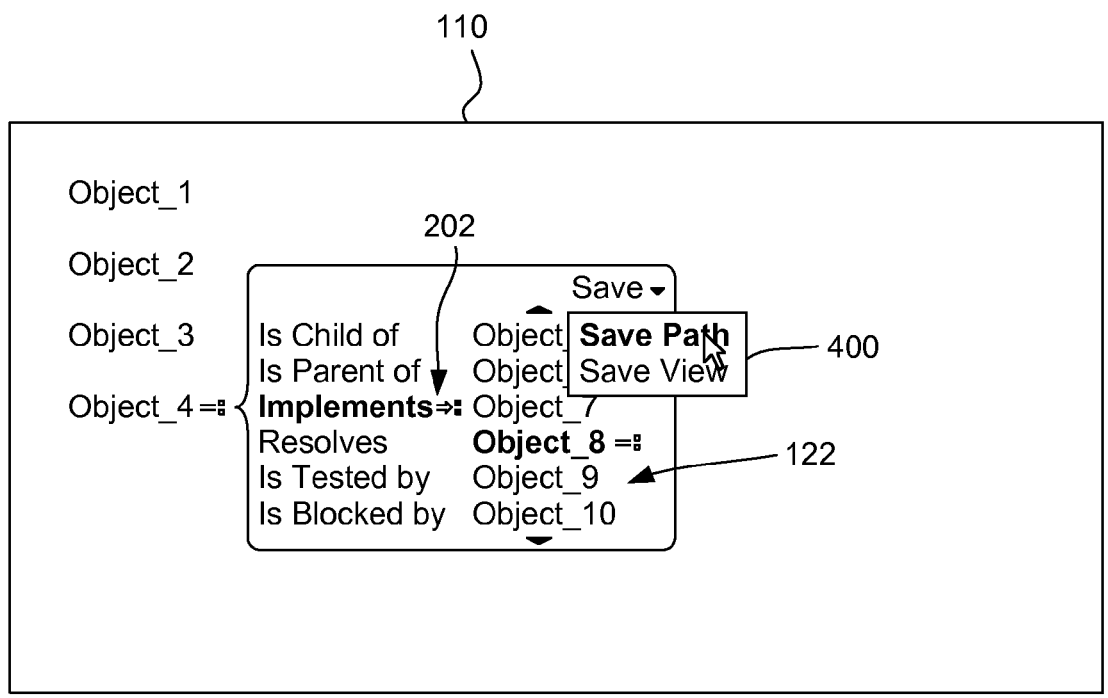
FIGS. 4A-4B depict a schematic diagram of one embodiment of the user interface of FIG. 2.
Figure 4B:
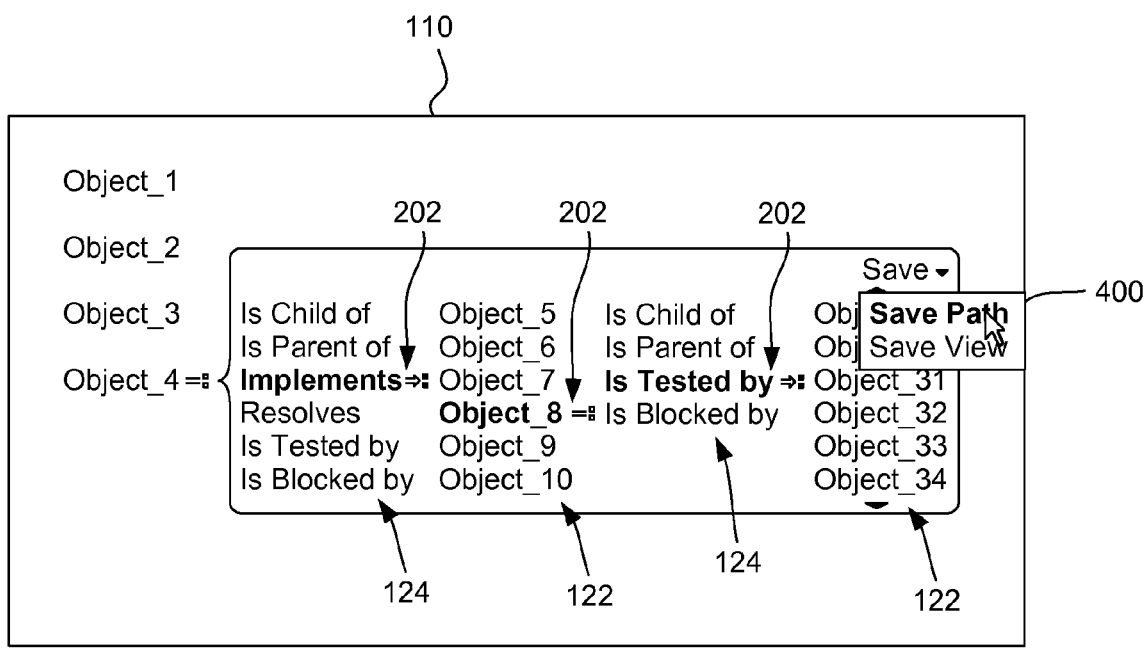

FIGS. 4A and 4B depict a schematic diagram of one embodiment of the user interface 110 of FIG. 2. In one embodiment, hovering over one of the possible relationships 124 displayed in the hover dialog 118 highlights the possible relationship 124 or otherwise displays the possible relationship 124 in a selected state.

In response to detecting a selection of the possible relationship 124, the user interface 110 may be configured to display a graphical icon 202, such as a relationship-object affordance. In one embodiment, the relationship-object affordance is different in appearance than the object-relationship affordance to indicate that the selected relationship 116 is a different element than the origin object 112. In one embodiment, selecting the graphical icon 202 causes the user interface 110 to display a list of possible objects 122 in the hover dialog 118. In one embodiment, the list of possible objects 122 is displayed next to the list of possible relationships 124. In other embodiments, the list of possible objects 122 may be displayed in other areas of the hover dialog 118. The list of possible objects 122 includes any objects which may be compatible with the selected possible relationship 124. In one embodiment, each of the possible objects 122 is also compatible with the origin object 112. In one embodiment, the hover dialog 118 may be responsive to compound hovering by the cursor, such that progressive lists of possible relationships 124 and lists of possible objects 122 may be opened in the hover dialog 118, as shown in FIG. 4B. The hover dialog 118 may expand as each list is opened by a hover event or other cursor event on each graphical icon 202 next to a highlighted element.

In one embodiment, the user interface 110 may be configured to present options to the user. The options may be accessible via a dropdown menu 400 or other menu in the hover dialog 118. The user may open the dropdown menu 400 by hovering over the dropdown menu 400 or by selecting an option in the dropdown menu 400 via a selection action. The dropdown menu 400 may include various operations that the user may perform on the contents of the hover dialog 118, or settings for the hover dialog 118.

For example, the dropdown menu 400 may include a function to save the relationship path 126, which saves the highlighted path of objects and corresponding relationships 116. The saved relationship path 126 may be displayed next to the origin object 112 in the user interface 110, which may allow for easy access or visibility of the relationships 116 between each of the objects related in some way to the origin object 112.

In one embodiment, the user is able to save the current view displayed in the hover dialog 118. The current view may include an exact view as displayed in the hover dialog 118 when the user chooses to save the current view, including all lists of possible objects 122 and lists of possible relationships 124 that are displayed, as well as each of the currently selected or highlighted objects 112 or relationships 116 in the hover dialog 118. The current view may include the navigation path 128 for the chain of object relationships 120. The current view may also include a current scroll position for each of the lists. In some embodiments, the hover dialog 118 may include several lists when the current view is saved. The saved current view may be restored to the hover dialog 118 after the hover dialog 118 is closed and re-opened. In some embodiments, if the hover dialog 118 is closed and re-opened again, the view in the hover dialog 118 may be reset to a default view.

In some embodiments, the user may backtrack through the navigation path 128 in the hover dialog 118 by highlighting an element anywhere in the chain of object relationships 120. If the new highlighted element is upstream in the navigation path 128 from any highlighted elements or presently displayed lists of possible objects 122 or lists of possible relationships 124, the current view in the hover dialog 118 may change to display an updated navigation path 128. For example, in an embodiment in which the current view of the navigation path 128 displays a list of possible objects 122 for a current highlighted relationship 116, the list of possible objects 122 displayed are compatible with the current highlighted relationship 116. If the user highlights a new relationship 116 in a list of possible relationships 124 that includes the current highlighted relationship 116, the list of possible objects 122 is changed to display objects compatible with the new relationship 116.

FIG. 5 depicts a schematic diagram of one embodiment of the user interface 110 of FIG. 2. In one embodiment, the user interface 110 is configured to display the saved relationship path 126 next to the origin object 112. The user may modify the relationship path 126 after the relationship path 126 is saved and displayed next to the origin object 112.

In one embodiment, when the cursor 200 hovers over one of the objects or relationships 116 within the saved relationship path 126, a graphical icon is displayed proximate the cursor 200. When the user selects the graphical icon, either by hovering over the graphical icon with the cursor 200 or clicking on the graphical icon, the hover dialog 118 is opened to display a list of possible relationships 124 (if the element from the saved relationship path 126 is an object) or a list of possible objects 122 (if the element from the saved relationship path 126 is a relationship 116). Selecting a new relationship path 126 in the hover dialog 118 based on an element from the saved relationship path 126 may add a new branch to the saved relationship path 126, as shown in FIG. 6, or replace the current saved relationship path 126 in the user interface 110 after the selected element with the new relationship path 126.

Figure 6:
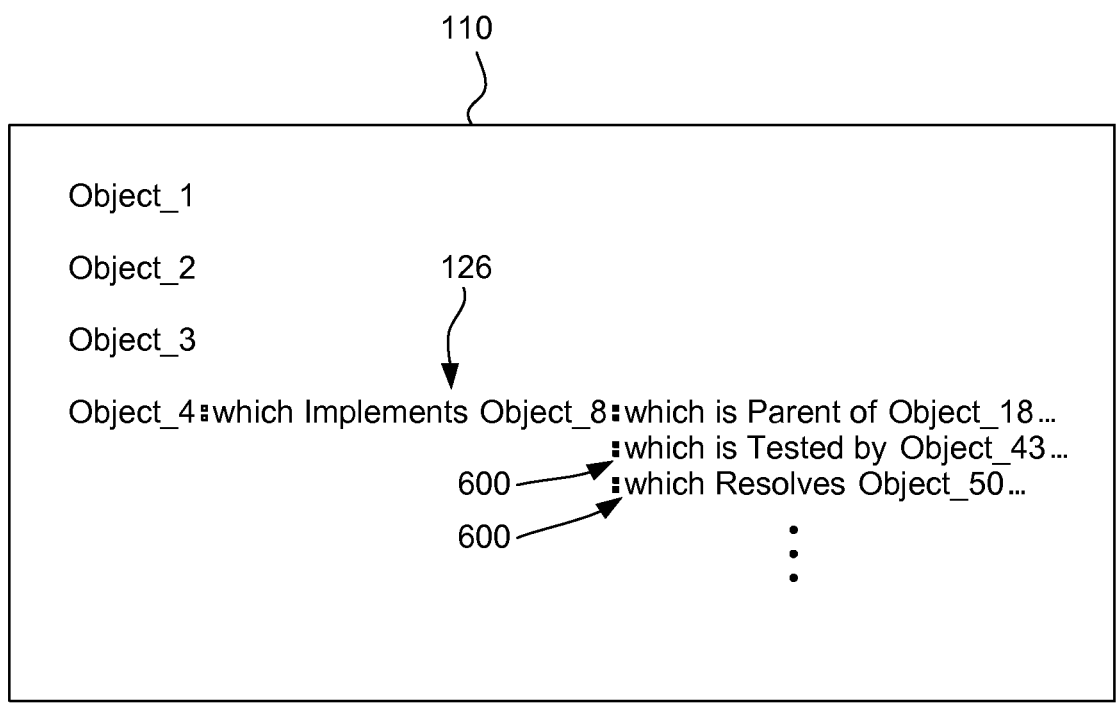
FIG. 6 depicts a schematic diagram of one embodiment of the user interface of FIG. 2.

FIG. 6 depicts a schematic diagram of one embodiment of the user interface 110 of FIG. 2. In some embodiments, the user may add branches to the relationship path 126. The relationship path 126 may branch any number of times and in any position within the relationship path 126 according to the given application. A branch 600 in a relationship path 126 indicates multiple relationships 116 for an object with one or more other objects. Each object or relationship 116 may branch multiple times. In some embodiments, the user interface 110 may be configured to allow the user to arrange the branches 600 for a given object or relationship 116 in a customized order. In some embodiments, the user may be able to perform other operations on each branch 600 in the relationship path 126.

Figure 7:
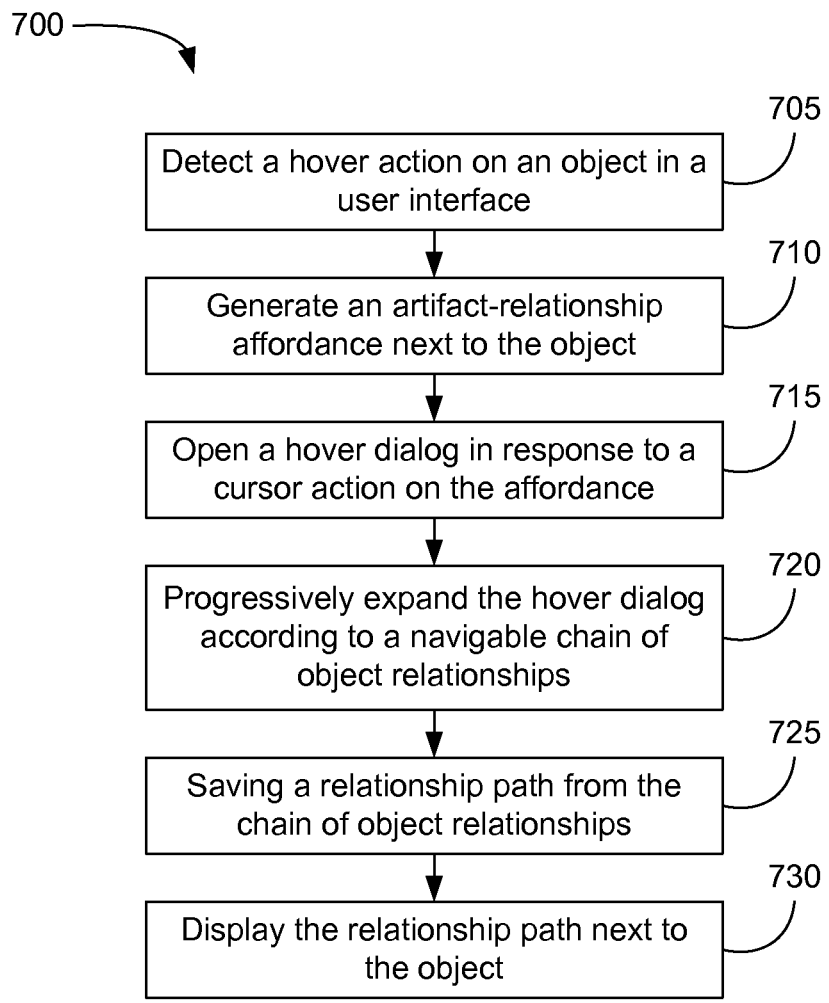
FIG. 7 depicts a flowchart diagram of one embodiment of a method for interacting with multi-dimensional object relationships.

FIG. 7 depicts a flowchart diagram of one embodiment of a method 700 for interacting with multi-dimensional object relationships. Although the method 700 is described in conjunction with the object-relationship management system 100 of FIG. 1, embodiments of the method 700 may be implemented with other types of object relationship management systems 100.

In one embodiment, the object relationship management system 100 is configured to detect 705 a cursor event by a cursor 200 on a first object 112 in the user interface 110. The user interface 110 is displayed on a display device, and the user may interact with the user interface 110 via any input method. In one embodiment, the system 100 is configured to generate 710 a visual object-relationship affordance proximate the first object 112 in response to detecting the cursor event. The cursor event may be a hover event on the first object 112 or another type of object selection method.

The dialog 118 is then opened 715 and displayed in the user interface 110 in response to detecting a second cursor event on the object-relationship affordance. An initial view in the hover dialog 118 may include a list of possible relationships 124 compatible with the first object 112. In one embodiment, the hover dialog 118 is configured to progressively expand 720 according to a navigable chain of object relationships 120. The chain of object relationships 120 includes progressive lists of possible objects 122 linked by lists of possible relationships 124. The hover dialog 118 may be responsive to compound hovering by the cursor 200 on elements within the chain of object relationships 120. Each list of possible objects 122 and possible relationships 124 is related to an element (object or relationship 116) from an immediately preceding list, with the exception that the first list of possible relationships 124 is related to the origin object 112 selected in the user interface 110.

In one embodiment, expanding the dialog 118 further includes highlighting an element within the hover dialog 118 in response to detecting a second cursor event by the cursor 200 on the element. The element may include one of a possible object 122 and a possible relationship 124 from the lists of possible objects 122 and the lists of possible relationships 124. A navigation path 128 may be displayed based on the highlighted element and a current position of the cursor 200 within the chain of object relationships 120.

In one embodiment, the dialog 118 may be expanded in response to detecting a second cursor event on a first relationship 116 in a list of possible relationships 124. The list of possible relationships 124 may include relationships 116 compatible with the first object 112. A list of possible objects 122 compatible with the first relationship 116 may then be displayed proximate the list of possible relationships 124. In one embodiment, the progressively expanding hover dialog 118 expands from left to right with each highlighted element.

In one embodiment, the system 100 saves 725 the relationship path 126 selected from the chain of object relationships 120 according to a user selection of a destination or second object 114. The relationship path 126 includes the second object 114 linked to the first object 112 by a first relationship 116. In some embodiments, the relationship path 126 may include one or more objects and corresponding linking relationships 116 between the first object 112 and the second object 114. The saved relationship path 126 may be displayed 730 next to the first object 112 on the user interface 110.

In one embodiment, the system 100 allows the user to save a plurality of branched relationship paths 126 corresponding to a given object in the chain of object relationships 120. The branched relationship paths 126 may be displayed next to the given object in the user interface 110. In one embodiment, the branched relationship paths 126 include several different relationships 116 between a single object and multiple related objects. In another embodiment, the branched relationship paths 126 include at least two objects related to the single object through the same relationship 116.

In one embodiment, the system 100 is configured to save a current view of the hover dialog 118. The current view may display the navigation path 128 for all highlighted elements within the chain of object relationships 120. Because the current view is saved, it may be recalled in the dialog 118 in response to re-opening the dialog 118 after the dialog 118 has been closed. This may be advantageous, especially when creating multiple branched relationship paths 126 from a long or deeply nested navigation path 128.

In one embodiment, the system 100 is configured to modify the navigation path 128 in response to detecting a third cursor event on a different element upstream in the navigation path 128. The element may be located anywhere within the chain of object relationships 120. This may allow a user to backtrack through the navigation path 128 by highlighting a different object or relationship 116, thereby shrinking the hover dialog 118 back to the current position of the cursor 200. The user may then proceed to progressively expand the dialog 118 from that position based on a newly highlighted element.

An embodiment of an object relationship management system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for interacting with multi-dimensional object relationships in an object relationship management system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
a non-transitory computer readable storage medium to store a computer readable program, wherein the computer readable program, when executed by a processor within a computer, causes the computer to perform operations for interacting with multi-dimensional object relationships, the operations comprising:
opening an expandable dialog in response to detecting a cursor hover event by a cursor on a first object in a user interface, wherein the user interface is displayed on a display device;
resizing the dialog according to a navigable chain of object relationships, wherein the chain of object relationships comprises progressive lists of possible objects linked by lists of possible relationships, wherein the dialog is responsive to compound hovering by the cursor to resize the dialog, wherein compound hovering comprises hovering the cursor progressively from one location to another along the navigable chain of object relationships to create a relationship path;
generating a visual object-relationship affordance proximate the first object in response to detecting the cursor hover event;
displaying the dialog in response to detecting a cursor event on the object-relationship affordance, wherein an initial view in the dialog comprises a list of possible relationships compatible with the first object;
generating a visual relationship-object affordance proximate a first relationship in the list of possible relationships; the visual object-relationship affordance is different in appearance compared to the visual relationship-object affordance;
displaying a save option in the dialog; and
saving, using the displayed save option, the relationship path selected from the chain of object relationships according to a user selection of a second object, wherein the relationship path comprises the second object linked to the first object by the first relationship.

2. The computer program product of claim 1, wherein resizing the dialog further comprises:
highlighting an element within the dialog in response to detecting a second cursor hover event on the element, wherein the element comprises one of a possible object and a possible relationship from the lists of possible objects and the lists of possible relationships; and
resizing the dialog to display a navigation path based on the highlighted element and a current position of the cursor within the chain of object relationships.

3. The computer program product of claim 2, wherein the computer readable program, when executed on the computer, causes the computer to perform additional operations, comprising:
- saving a current view of the dialog, wherein the current view displays the navigation path for all highlighted elements within the chain of object relationships; and
- recalling the current view in the dialog in response to re-opening the dialog.

4. The computer program product of claim 2, wherein the computer readable program, when executed on the computer, causes the computer to perform additional operations, comprising:
- modifying the navigation path in response to detecting a third cursor hover event on a different element upstream in the navigation path, wherein the element is located anywhere within the chain of object relationships.

5. The computer program product of claim 1, wherein resizing the dialog further comprises:
- detecting a second cursor hover event on the first relationship in the list of possible relationships, wherein the list of possible relationships comprises relationships compatible with the first object; and
- displaying a list of possible objects proximate the list of possible relationships, wherein the list of possible objects comprises objects compatible with the first relationship.

6. The computer program product of claim 1, wherein the computer readable program, when executed on the computer, causes the computer to perform additional operations, comprising:
- saving a plurality of branched relationship paths corresponding to a given object in the chain of object relationships; and
- displaying the plurality of branched relationship paths next to the given object in the user interface.

7. A method for interacting with multi-dimensional object relationships, comprising:
- opening an expandable dialog in response to detecting a cursor hover event by a cursor on a first object in a user interface, wherein the user interface is displayed on a display device;
- resizing the dialog according to a navigable chain of object relationships, wherein the chain of object relationships comprises progressive lists of possible objects linked by lists of possible relationships, wherein the dialog is responsive to compound hovering by the cursor to resize the dialog, wherein compound hovering comprises hovering the cursor progressively from one location to another along the navigable chain of object relationships to create a relationship path;
- generating a visual object-relationship affordance proximate the first object in response to detecting the cursor hover event;
- displaying the dialog in response to detecting a cursor event on the object-relationship affordance, wherein an initial view in the dialog comprises a list of possible relationships compatible with the first object;
- generating a visual relationship-object affordance proximate a first relationship in the list of possible relationships; the visual object-relationship affordance is different in appearance compared to the visual relationship-object affordance;
- displaying a save option in the dialog; and
- saving, using the displayed save option, the relationship path selected from the chain of object relationships according to a user selection of a second object, wherein the relationship path comprises the second object linked to the first object by the first relationship.

8. The method of claim 7, wherein resizing the dialog further comprises:
- highlighting an element within the dialog in response to detecting a second cursor hover event on the element, wherein the element comprises one of a possible object and a possible relationship from the lists of possible objects and the lists of possible relationships; and
- resizing the dialog to display a navigation path based on the highlighted element and a current position of the cursor within the chain of object relationships.

9. The method of claim 8, further comprising:
- saving a current view of the dialog, wherein the current view displays the navigation path for all highlighted elements within the chain of object relationships; and
- recalling the current view in the dialog in response to re-opening the dialog.

10. The method of claim 8, further comprising:
- modifying the navigation path in response to detecting a third cursor hover event on a different element upstream in the navigation path, wherein the element is located anywhere within the chain of object relationships.

11. The method of claim 7, wherein resizing the dialog further comprises:
- detecting a second cursor hover event on the first relationship in the list of possible relationships, wherein the list of possible relationships comprises relationships compatible with the first object; and
- displaying a list of possible objects proximate the list of possible relationships, wherein the list of possible objects comprises objects compatible with the first relationship.

12. The method of claim 7, further comprising:
- saving a plurality of branched relationship paths corresponding to a given object in the chain of object relationships; and
- displaying the plurality of branched relationship paths next to the given object in the user interface.

13. An object relationship management system comprising:
- a display device displaying a user interface, wherein the user interface is configured to:
  - open an expandable dialog in response to detecting a cursor hover event by a cursor on a first object in the user interface;
  - resize the dialog according to a navigable chain of object relationships, wherein the chain of object relationships comprises progressive lists of possible objects linked by lists of possible relationships, wherein the dialog is responsive to compound hovering by the cursor to resize the dialog, wherein compound hovering comprises hovering the cursor progressively from one location to another along the navigable chain of object relationships to create a relationship path;
  - generate a visual object-relationship affordance proximate the first object in response to detecting the cursor hover event;
  - display the dialog in response to detecting a cursor event on the object-relationship affordance, wherein an initial view in the dialog comprises a list of possible relationships compatible with the first object;
  - generate a visual relationship-object affordance proximate a first relationship in the list of possible relationships; the visual object-relationship affordance is different in appearance compared to the visual relationship-object affordance;

displaying a save option in the dialog; and save, using the displayed save option, the relationship path selected from the chain of object relationships according to a user selection of a second object, wherein the relationship path comprises the second object linked to the first object by the first relationship.

14. The system of claim 13, wherein resizing the dialog further comprises:

highlighting an element within the dialog in response to detecting a second cursor hover event on the element, wherein the element comprises one of a possible object and a possible relationship from the lists of possible objects and the lists of possible relationships; and resizing the dialog to display a navigation path based on the highlighted element and a current position of the cursor within the chain of object relationships.

15. The system of claim 14, wherein the user interface is further configured to:

save a current view of the dialog, wherein the current view displays the navigation path for all highlighted elements within the chain of object relationships; and recall the current view in the dialog in response to re-opening the dialog.

16. The system of claim 14, wherein the user interface is further configured to:

modify the navigation path in response to detecting a third cursor hover event on a different element upstream in the navigation path, wherein the element is located anywhere within the chain of object relationships.

17. The system of claim 13, wherein the user interface is further configured to:

save a plurality of branched relationship paths corresponding to a given object in the chain of object relationships; and display the plurality of branched relationship paths next to the given object in the user interface.

* * * * *